United States Patent
Chih

(10) Patent No.: US 7,584,933 B2
(45) Date of Patent: Sep. 8, 2009

(54) ADJUSTABLE LIFT SUPPORT APPARATUS

(75) Inventor: Ting-Hui Chih, Taoyuan (TW)

(73) Assignee: Qisda Corporation, Taoyuan County (TW)

( * ) Notice: Subject to any disclaimer, the term of this patent is extended or adjusted under 35 U.S.C. 154(b) by 310 days.

(21) Appl. No.: 11/327,523

(22) Filed: Jan. 6, 2006

(65) Prior Publication Data
US 2006/0226327 A1    Oct. 12, 2006

(30) Foreign Application Priority Data
Apr. 8, 2005    (TW) .............................. 94111128 A

(51) Int. Cl.
*A47G 29/00*    (2006.01)
(52) U.S. Cl. ................. 248/372.1; 248/371; 248/176.1; 248/584; 74/89.13; 74/20; 361/679.02; 361/679.21
(58) Field of Classification Search ................. 248/422, 248/133, 139, 140, 142, 371, 372.1, 373, 248/395, 161, 162.1, 404, 407, 408, 584, 248/917, 920, 923, 918, 919, 157, 183.4, 248/292.12, 585, 586, 587, 588, 589, 590; 361/679.02, 679.21; 74/20, 640, 473.21, 74/89.13; 254/1, 209, 126, 97
See application file for complete search history.

(56) References Cited

U.S. PATENT DOCUMENTS

| 4,234,150 | A | * | 11/1980 | Mee et al. .............. 248/281.11 |
| 4,682,749 | A | * | 7/1987 | Strater ..................... 248/284.1 |
| 4,834,329 | A | * | 5/1989 | Delapp .................... 248/183.3 |
| 5,924,665 | A | * | 7/1999 | Sweere et al. ............ 248/285.1 |
| 7,025,332 | B2 | * | 4/2006 | Rincoe ........................ 254/126 |
| 7,252,277 | B2 | * | 8/2007 | Sweere et al. ............... 248/371 |
| 2006/0054751 | A1 | * | 3/2006 | Johnson et al. ......... 248/123.11 |

* cited by examiner

*Primary Examiner*—J. Allen Shriver
*Assistant Examiner*—Todd M. Epps

(57) ABSTRACT

An adjustable lift support apparatus includes a holder, a base, a first fixed shaft, a support, a second fixed shaft, and a transmission shaft. The first fixed shaft is connected to the base and the holder, and a first gear is mounted thereon. The second fixed shaft is connected to the support and the holder, and a fourth gear is mounted thereon. The transmission shaft is rotatably mounted on the holder, and a second gear is mounted thereon meshing with the first gear and a third gear is mounted thereon meshing with the fourth gear. The support is lifted or lowered by a force to make the second gear rotate with respect to the first gear which is fixed and the third gear rotate with respect to the fourth gear, so as to adjust the height of the support and maintain an included angle between the support and the base.

9 Claims, 5 Drawing Sheets

ADJUSTABLE LIFT SUPPORT APPARATUS

BACKGROUND OF THE INVENTION

1. Field of the Invention

The invention relates to an adjustable lift support apparatus, and more particularly to an adjustable lift support apparatus capable of maintaining a specific angle between a support and a base during lifting or lowering of the support together with a holder.

2. Description of the Prior Art

Recently, flat panel displays have become an increasingly popular substitute for projection devices and cathode ray tube (CRT) displays. The flat panel display, e.g. a liquid crystal display (LCD), is typically mounted on a lift apparatus to be lifted or lowered.

Ideally, the height of the flat panel display can be adjusted for optimum viewing. Various prior arts with regard to the lift apparatus have been used, such as mechanical ball track with constant force spring, mechanical linkages with springs, and so on. However, because the torsion of the springs of the above-mentioned lift apparatus always maintains constant and cannot be adjusted, it is inconvenient for various users. Furthermore, after the lift apparatus is used for a span of time, the spring may lose its elasticity due to the fatigue. Moreover, the cost of the above-mentioned lift apparatus is higher, and the structure is more complicated.

Therefore, the objective of the invention is to provide an adjustable lift support apparatus to solve the above-mentioned problems.

SUMMARY OF THE INVENTION

The objective of the invention is to provide an adjustable lift support apparatus utilizing at least one set of gears together with a transmission shaft to adjust the height of a support corresponding to a base. Furthermore, during lifting or lowering of the support together with the holder, the adjustable lift support apparatus can maintain an included angle between the support and the base constant. Moreover, the cost of the invention is lower, and the structure is simpler than prior art.

According to a preferred embodiment of the invention, the adjustable lift support apparatus comprises a holder, a base, a first fixed shaft, a support, a second fixed shaft, and a transmission shaft. The base defines a first axis, and the support defines a second axis, wherein an included angle is defined between the first axis and the second axis. The first fixed shaft has a first end and a second end, and the first fixed shaft is via the first end attached onto the base and via the second end attached onto the holder. The first fixed shaft further has a first gear mounted near the second end. The second fixed shaft has a fifth end and a sixth end, and the second fixed shaft is via the fifth end attached onto the support and via the sixth end attached onto the holder. The second fixed shaft further has a fourth gear mounted near the sixth end. The transmission shaft has a third end and a fourth end, and the transmission shaft is rotatably mounted on the holder. The transmission shaft further has a second gear mounted near the third end and a third gear mounted near the fourth end, wherein the second gear meshes with the first gear and the third gear meshes with the fourth gear.

According to the above-mentioned adjustable lift support apparatus, lifting or lowering of the support together with the holder is actuated by applying an external force on the support or the holder, so as to make the second gear rotate with respect to the first gear which is motionless and the third gear rotate with respect to the fourth gear, such that during lifting or lowering of the support together with the holder, the included angle between the first axis and the second axis maintains constant.

Accordingly, the adjustable lift support apparatus of the invention utilizes two sets of gears together with the transmission shaft to adjust the height of the support corresponding to the base. Furthermore, during lifting or lowering of the support together with the holder, the adjustable lift support apparatus can maintain the included angle between the support and the base constant. Moreover, the cost of the invention is lower, and the structure is simpler.

The advantage and spirit of the invention may be understood by the following recitations together with the appended drawings.

BRIEF DESCRIPTION OF THE APPENDED DRAWINGS

DETAILED DESCRIPTION OF THE INVENTION

Figure 1:
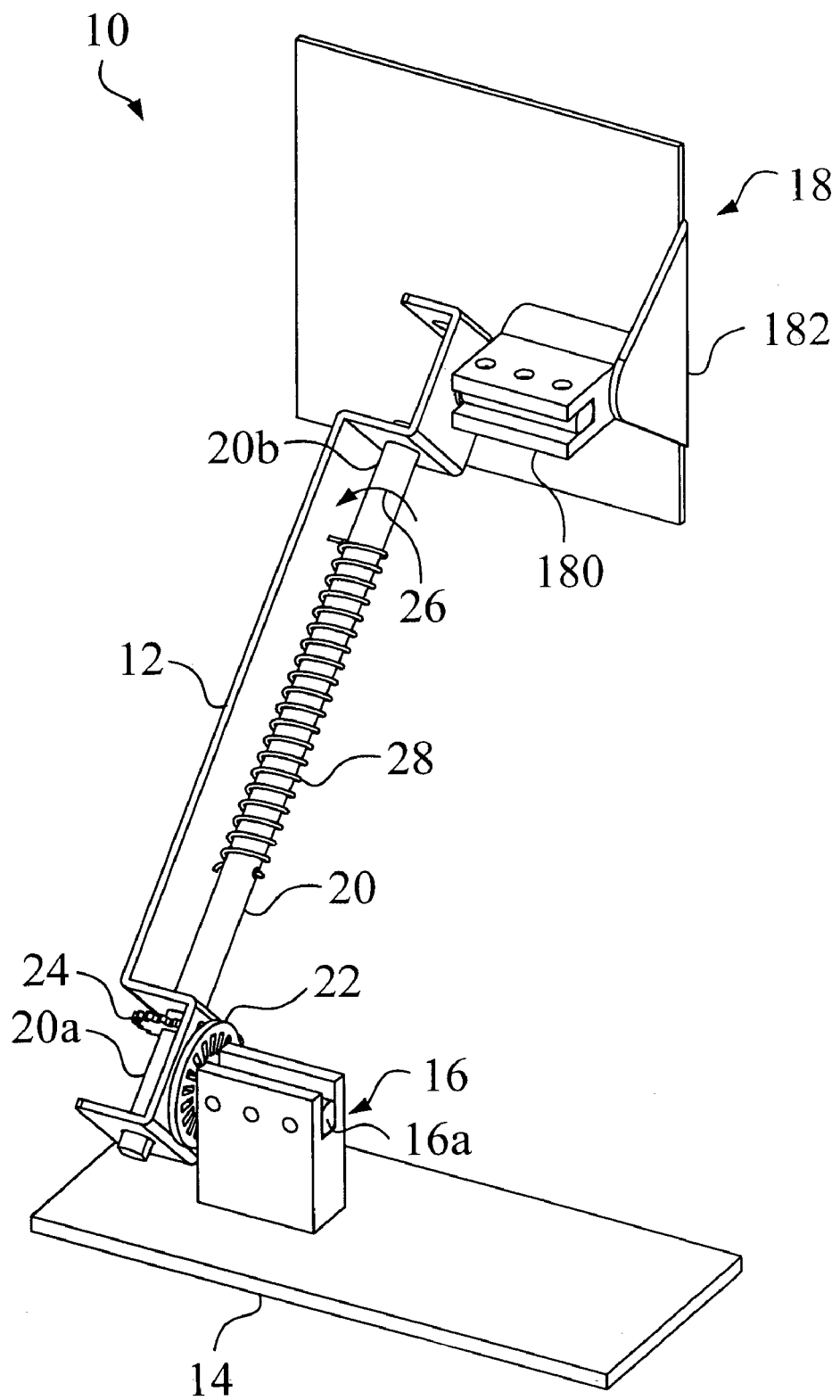
FIG. 1 is an outside view illustrating an adjustable lift support apparatus according to a preferred embodiment of the invention.

Referring to FIG. 1, FIG. 1 is an outside view illustrating an adjustable lift support apparatus 10 according to a preferred embodiment of the invention. The adjustable lift support apparatus 10 comprises a holder 12, a base 14, a first fixed shaft 16, a support 18, and a transmission shaft 20. For practical application, the transmission shaft 20 can be substantially designed as pillared. In this embodiment, the transmission shaft 20 is designed as cylinder.

As shown in FIG. 1, the first fixed shaft 16 has a first end 16a and a second end (not shown in FIG. 1). The first fixed shaft 16 is via the first end 16a attached onto the base 14 and via the second end attached onto the holder 12. The first fixed shaft 16 further has a first gear 22 mounted near the second end. The transmission shaft 20 has a third end 20a and a fourth end 20b. The transmission shaft 20 is rotatably mounted on the holder 12 and has a second gear 24 mounted near the third end 20a, wherein the second gear 24 meshes with the first gear 22. The support 18 is mounted onto the holder 12 and near the fourth end 20b of the transmission shaft 20. The number of teeth of the aforementioned gears can be adjustable based on different application.

According to the aforementioned adjustable lift support apparatus 10, lifting or lowering of the support 18 together with the holder 12 is actuated by applying an external force on the support 18 or the holder 12 to make the second gear 24 rotate with respect to the first gear 22 which is motionless, so as to adjust the height of the support 18 corresponding to the base 14. For example, when a user wants to lower the height of the support 18 corresponding to the base 14, he/she has to apply a downward force on the support 18 or the holder 12, so as to actuate the transmission shaft 20 to rotate in the direction as the arrow 26 shown in FIG. 1 indicates. At the same time, the second gear 24 will rotate with respect to the first gear 22 which is motionless, so that the support 18 together with the holder 12 is lowered.

As shown in FIG. 1, the adjustable lift support apparatus 10 further comprises a resilient member 28. The resilient member 28 is via one end thereof attached onto the holder 12 and via the other end thereof attached onto the transmission shaft 20. The resilient member 28 is used for assisting in lifting or lowering the support 18 together with the holder 12, such that the movement of the support 18 together with the holder 12 will be smoother. For practical application, the resilient member 28 can be a coil spring or the like.

In this embodiment, the support 18 also comprises a bracket 180 and a frame 182 pivotally attached onto the bracket 180. The support 18 is attached onto the holder 12 by the bracket 180, and the frame 182 is rotatable. Accordingly, the user can adjust an included angle between the support 18 and the base 14 based on his/her own requirement.

Figure 2:
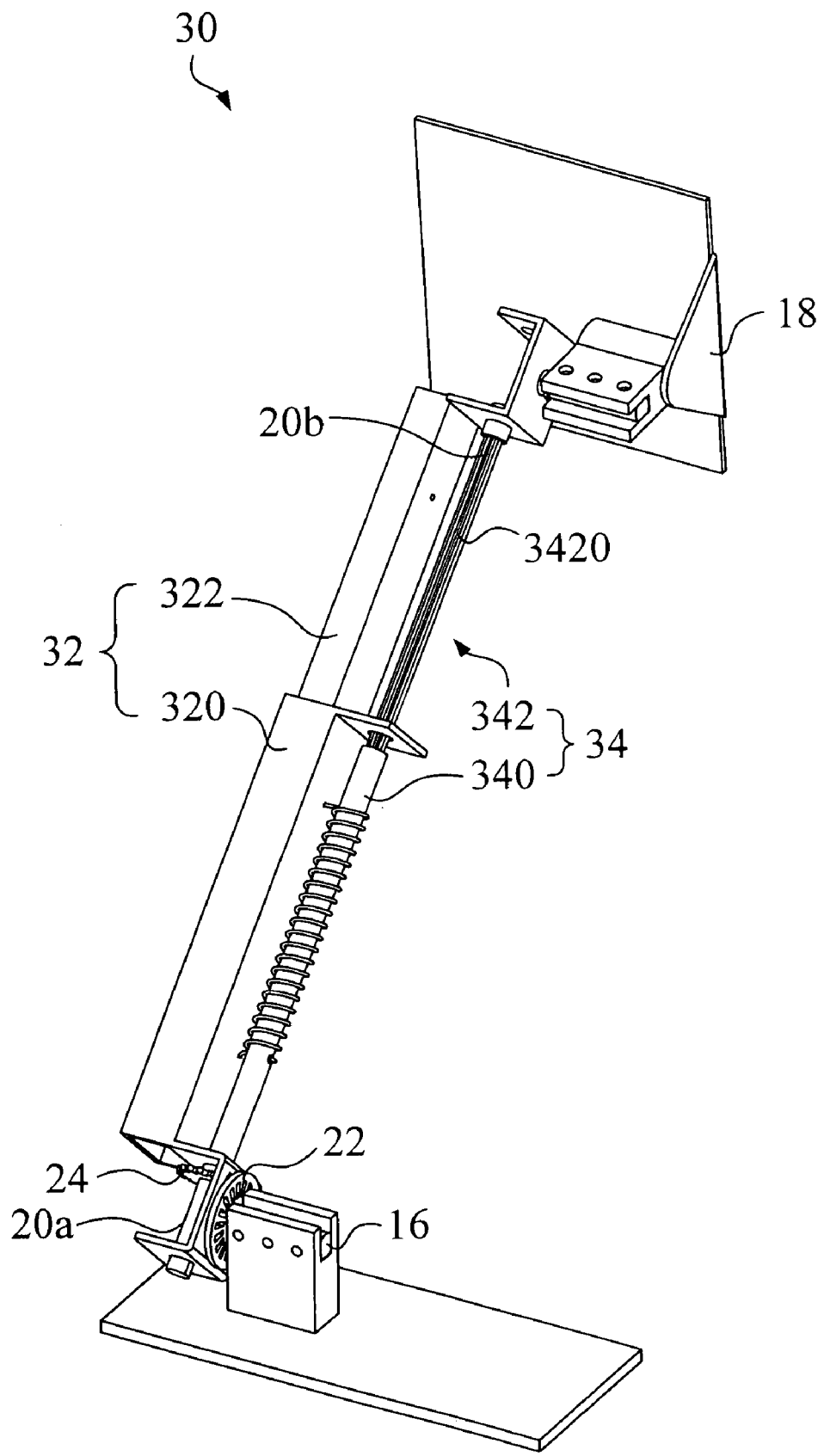
FIG. 2 is an outside view illustrating an adjustable lift support apparatus according to another preferred embodiment of the invention.

Referring to FIG. 2, FIG. 2 is an outside view illustrating an adjustable lift support apparatus 30 according to another preferred embodiment of the invention. The main difference between the adjustable lift support apparatus 30 and the adjustable lift support apparatus 10 is that the holder 32 of the adjustable lift support apparatus 30 comprises a first sleeve 320 and a first connecting member 322, and the transmission shaft 34 comprises a second sleeve 340 and a second connecting member 342. As shown in FIG. 2, the first connecting member 322 is movably disposed in the first sleeve 320, and the second connecting member 342 is movably disposed in the second sleeve 340, such that the length of the holder 32 and the transmission shaft 34 is adjustable based on the user's requirement. The first fixed shaft 16 is attached onto the first sleeve 320 of the holder 32 via the second end (not shown in FIG. 2), and the support 18 is attached onto the first connecting member 322 of the holder 32. The second sleeve 340 provides the third end 20*a* and the inner surface of the second sleeve 340 has at least one groove (not shown in FIG. 2). The second connecting member 342 provides the fourth end 20*b*, and the outer surface of the second connecting member 342 has at least one rib 3420, wherein each of the at least one rib 3420 corresponds to one of the at least one groove of the second sleeve 340, respectively. In this embodiment, when the second gear 24 rotates with respect to the first gear 22, the second connecting member 342 will also rotate with the second sleeve 340 by cooperation of each rib 3420 and the corresponding groove. The adjustable lift support apparatus 30 shown in FIG. 2 and the adjustable lift support apparatus 10 shown in FIG. 1 both work on the same principle, so duplicated details are not given here.

Figure 3:
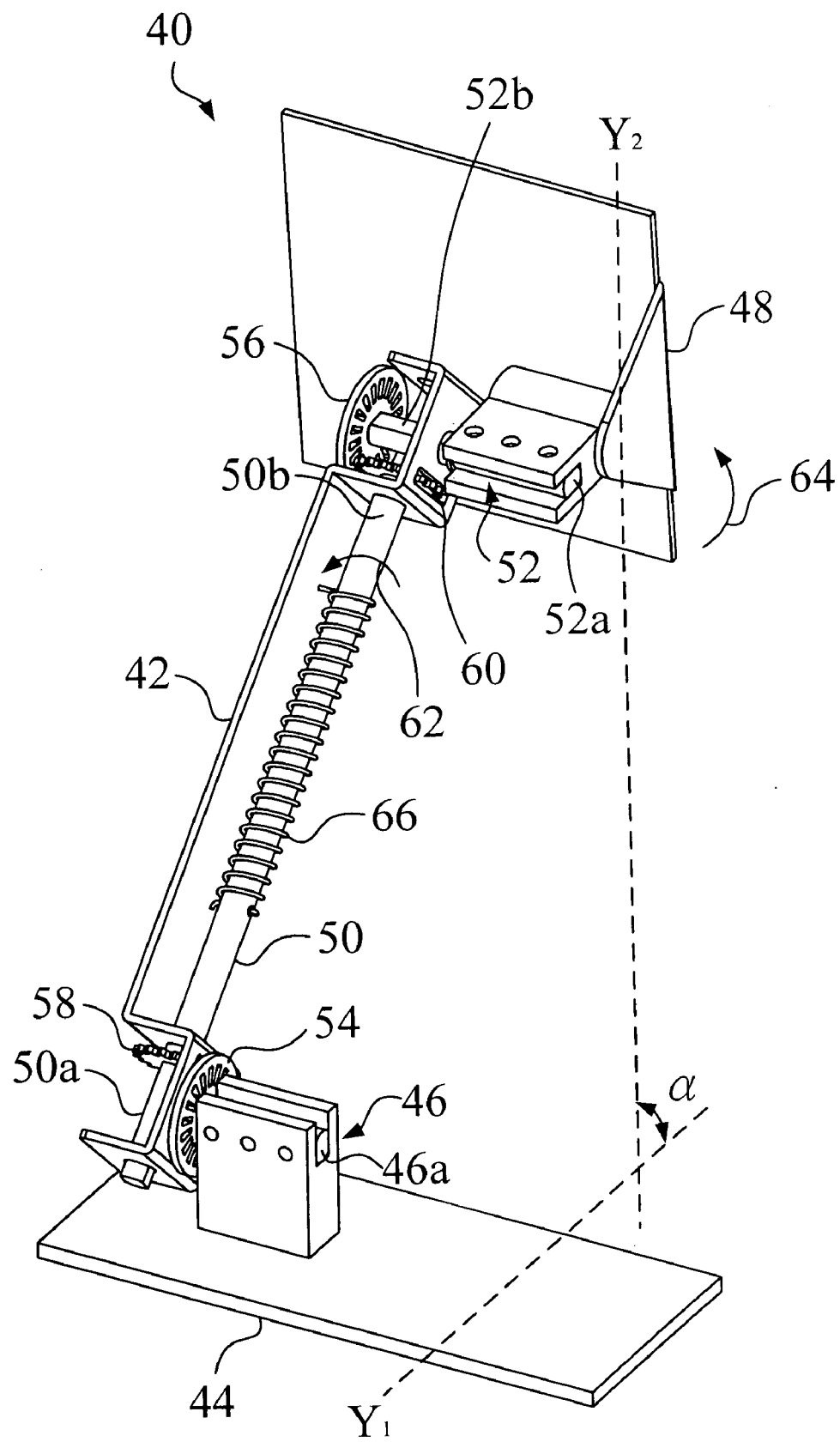
FIG. 3 is an outside vie illustrating an adjustable lift support apparatus according to another preferred embodiment of the invention.

Referring to FIG. 3, FIG. 3 is an outside vie illustrating an adjustable lift support apparatus 40 according to another preferred embodiment of the invention. The adjustable lift support apparatus 40 comprises a holder 42, a base 44, a first fixed shaft 46, a support 48, a transmission shaft 50, and a second fixed shaft 52. For practical application, the transmission shaft 50 can be substantially designed as pillared. In this embodiment, the transmission shaft 50 is designed as cylinder.

As shown in FIG. 3, the base 44 defines a first axis $Y_1$, and the support 48 defines a second axis $Y_2$, wherein an included angle α is defined between the first axis $Y_1$ and the second axis $Y_2$. The first fixed shaft 46 has a first end 46*a* and a second end (not shown in FIG. 3). The first fixed shaft 46 is via the first end 46*a* attached onto the base 44 and via the second end attached onto the holder 42. The first fixed shaft 46 further has a first gear 54 mounted near the second end. The second fixed shaft 52 has a fifth end 52*a* and a sixth end 52*b*. The second fixed shaft 52 is via the fifth end 52*a* attached onto the support 48 and via the sixth end 52*b* attached onto the holder 42. The second fixed shaft 52 further has a fourth gear 56 mounted near the sixth end 52*b*. The transmission shaft 50 has a third end 50*a* and a fourth end 50*b*. The transmission shaft 50 is rotatably mounted on the holder 42. The transmission shaft 50 further has a second gear 58 mounted near the third end 50*a* and a third gear 60 mounted at near the fourth end 50*b*, wherein the second gear 58 meshes with the first gear 54, and the third gear 60 meshes with the fourth gear 56. The number of teeth of the aforementioned gears can be adjustable based on different application.

According to the aforementioned adjustable lift support apparatus 40, lifting and lowering of the support 48 together with the holder 42 is actuated by applying an external force on the support 48 or the holder 42 to make the second gear 58 rotate with respect to the first gear 54 which is motionless. At the same time, the third gear 60 also rotates with respect to the fourth gear 56, such that during lifting or lowering of the support 48 together with the holder 42, the included angle α maintains constant. For example, when a user wants to lower the height of the support 48 corresponding to the base 44, he/she has to apply a downward force on the support 48 or the holder 42, so as to actuate the transmission shaft 50 to rotate in the direction as the arrow 62 shown in FIG. 3 indicates. Afterward, the second gear 58 will rotate with respect to the first gear 54 which is motionless, so that the support 48 together with the holder 42 is lowered. At the same time, the third gear 60 will also rotate with respect to the fourth gear 56, and then the second fixed shaft 52 together with the fourth gear 56 will rotate in the direction as the arrow 64 shown in FIG. 3 indicates. Accordingly, during the lowering of the support 48 together with the holder 42, the included angle α maintains constant.

As shown in FIG. 3, the adjustable lift support apparatus 40 further comprises a resilient member 66. The resilient member 66 is via one end thereof attached onto the holder 42 and via the other end thereof attached onto the transmission shaft 50. The resilient member 66 is used for assisting in lifting or lowering the support 48 together with the holder 42, such that the movement of the support 48 together with the holder 42 will be smoother. For practical application, the resilient member 66 can be a coil spring or the like.

Figure 4:
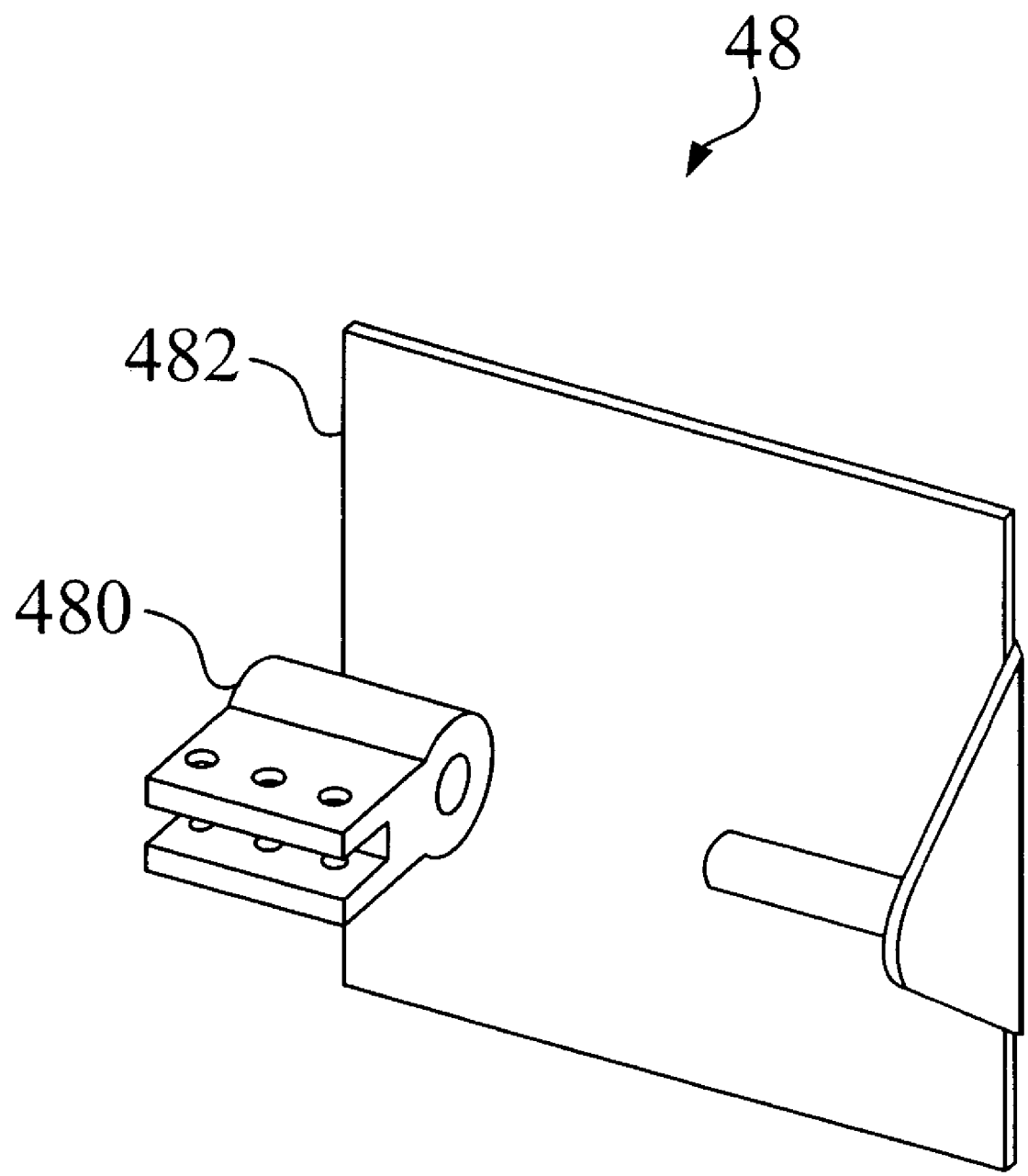
FIG. 4 is an exploded view illustrating the support shown in FIG. 3.

Referring to FIG. 4, FIG. 4 is an exploded view illustrating the support 48 shown in FIG. 3. In this embodiment, the support 48 also comprises a bracket 480 and a frame 482 pivotally attached onto the bracket 480. The fifth end 52*a* of the second fixed shaft 52 is attached onto the bracket 480 of the support 48, and the frame 482 is rotatable. Accordingly, the user can adjust the included angle α between the support 48 and the base 44 based on his/her own requirement.

Figure 5:
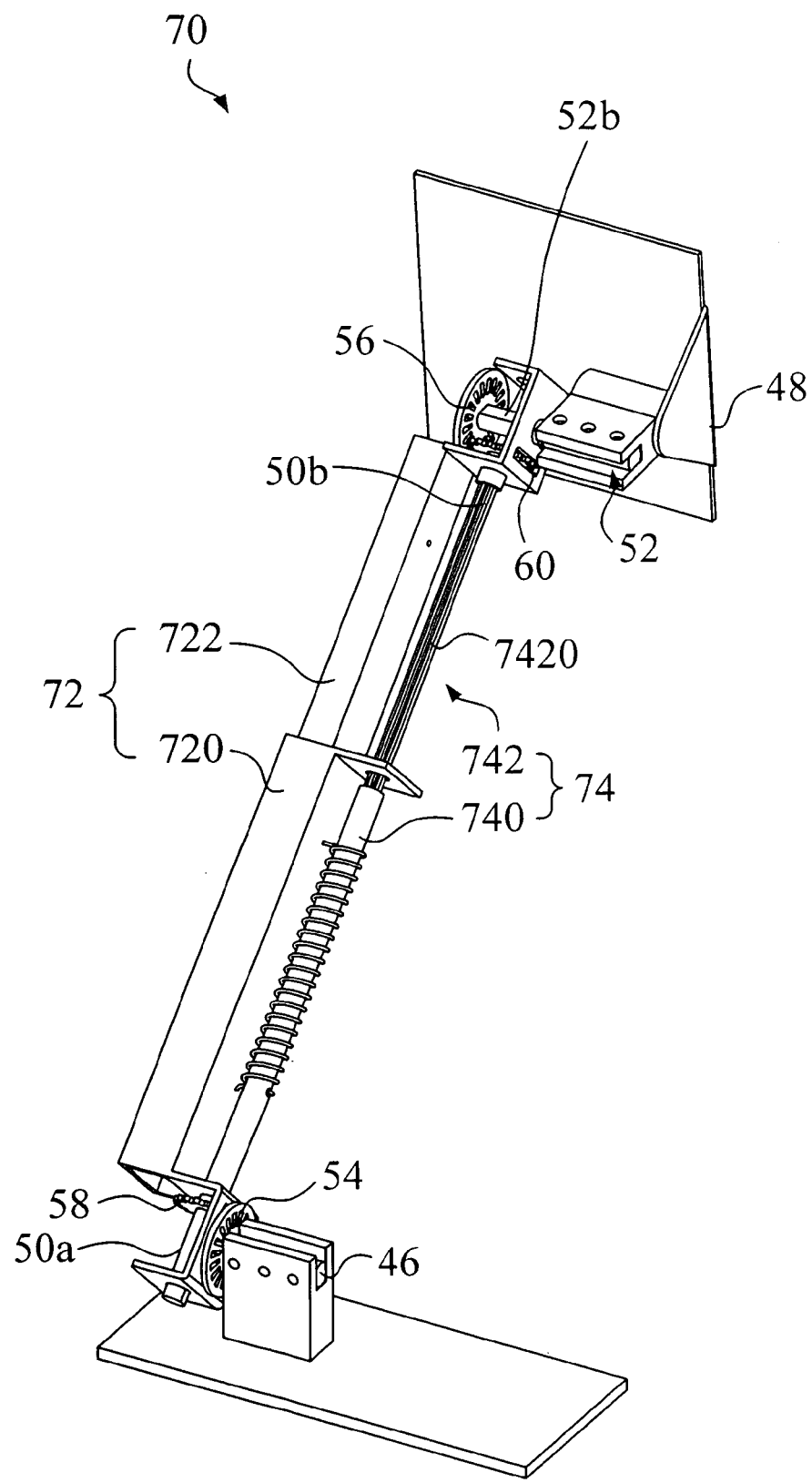
FIG. 5 is an outside view illustrating an adjustable lift support apparatus according to another preferred embodiment of the invention.

Referring to FIG. 5, FIG. 5 is an outside view illustrating an adjustable lift support apparatus 70 according to another preferred embodiment of the invention. The main difference between the adjustable lift support apparatus 70 and the adjustable lift support apparatus 40 is that the holder 72 of the adjustable lift support apparatus 70 comprises a first sleeve 720 and a first connecting member 722, and the transmission shaft 74 comprises a second sleeve 740 and a second connecting member 742. As shown in FIG. 5, the first connecting member 722 is movably disposed in the first sleeve 720, and the second connecting member 742 is movably disposed in the second sleeve 740, such that the length of the holder 72 and the transmission shaft 74 is adjustable based on the user's requirement. The first fixed shaft 46 is attached onto the first sleeve 720 of the holder 72 via the second end (not shown in FIG. 5), and the second fixed shaft 52 is attached onto the first connecting member 722 of the holder 72 via the sixth end 52b. The second sleeve 740 provides the third end 50a and the inner surface of the second sleeve 740 has at least one groove (not shown in FIG. 5). The second connecting member 742 provides the fourth end 50b, and the outer surface of the second connecting member 742 has at least one rib 7420, wherein each of the at least one rib 7420 corresponds to one of the at least one groove of the second sleeve 740, respectively. In this embodiment, when the second gear 58 rotates with respect to the first gear 54, the second connecting member 742 will also rotate with the second sleeve 740 by cooperation of each rib 7420 and the corresponding groove, such that the third gear 60 will also rotate with respect to the fourth gear 56. The adjustable lift support apparatus 70 shown in FIG. 5 and the adjustable lift support apparatus 40 shown in FIG. 3 both work on the same principle, so the duplicated details are not given here.

Compared to the prior art, the adjustable lift support apparatus of the invention utilizes two sets of gears together with the transmission shaft to adjust the height of the support corresponding to the base. Furthermore, during lifting or lowering of the support together with the holder, the adjustable lift support apparatus can maintain the included angle between the support and the base constant. On the other hand, the invention may utilize one set of gears together with the transmission shaft to adjust the height of the support corresponding to the base and further adjust the included angle between the support and the base by the rotation of the support. Moreover, the cost of the invention is lower, and the structure is simpler.

With the example and explanations above, the features and spirits of the invention will be hopefully well described. Those skilled in the art will readily observe that numerous modifications and alterations of the device may be made while retaining the teaching of the invention. Accordingly, the above disclosure should be construed as limited only by the metes and bounds of the appended claims.

What is claimed is:

1. An adjustable lift support apparatus, comprising:
   a holder;
   a base;
   first fixed shaft having a first end and a second end, the first fixed shaft being attached onto the base via the first end and attached onto the holder via the second end, the first fixed shaft further having a first gear mounted near the second end;
   a transmission shaft having a third end and a fourth end, the transmission shaft being rotatably mounted on the holder and having a second gear mounted near the third end, the second gear meshing with the first gear;
   a support mounted onto the holder and near the fourth end of the transmission shaft; and
   a resilient member having a seventh end and an eighth end, the resilient member being attached onto the holder via the seventh end and attached onto the transmission shaft via the eighth end, for assisting in lifting or lowering the support together with the holder,
   wherein lifting or lowering of the support together with the holder is actuated by applying an external force on the support or the holder to make the second gear rotate with respect to the first gear, so as to adjust the height of the support corresponding to the base.

2. The adjustable lift support apparatus of claim 1, wherein the support comprises a bracket and a frame pivotally attached onto the bracket, and the support is attached onto the holder by the bracket.

3. The adjustable lift support apparatus of claim 1, wherein the holder comprises a first sleeve and a first connecting member movably disposed in the first sleeve, the first fixed shaft is attached onto the first sleeve of the holder via the second end, and the support is attached onto the first connecting member of the holder.

4. The adjustable lift support apparatus of claim 3, wherein the transmission shaft comprises: a second sleeve providing the third end and an inner surface, the inner surface of the second sleeve having at least one groove; and a second connecting member providing the fourth end and an outer surface, the second connecting member being movably disposed in the second sleeve, the outer surface of the second connecting member having at least one rib, and each of the at least one rib corresponding to one of the at least one groove, respectively; wherein when the second gear rotates with respect to the first gear, the second connecting member rotates with the second sleeve by cooperation of each rib and the corresponding groove.

5. The adjustable lift support apparatus of claim 1, wherein the base defines a first axis, the support defines a second axis, an included angle is defined between the first axis and the second axis, a third gear is mounted near the fourth end of the transmission shaft, and the adjustable lift support apparatus further comprises:
   a second fixed shaft having a fifth end and a sixth end, the second fixed shaft being attached onto the support via the fifth end and attached onto the holder via the sixth end, the second fixed shaft further having a fourth gear mounted near the sixth end;
   wherein the third gear meshes with the fourth gear, and when the second gear rotates with respect to the first gear, the third gear also rotates with respect to the fourth gear, such that during the lifting and the lowering of the support together with the holder, the included angle maintains constant.

6. The adjustable lift support apparatus of claim 5, wherein the support comprises a bracket and a frame pivotally attached onto the bracket, and the second fixed shaft is attached onto the bracket of the support via the fifth end.

7. The adjustable lift support apparatus of claim 5, wherein the holder comprises a first sleeve and a first connecting member movably disposed in the first sleeve, the first fixed shaft is attached onto the first sleeve of the holder via the second end, the second fixed shaft is attached onto the first connecting member of the holder via the sixth end, and the transmission shaft comprises: a second sleeve providing the third end and an inner surface, the inner surface of the second sleeve having at least one groove; and a second connecting member providing the fourth end and an outer surface, the second connecting member being movably disposed in the second sleeve, and the outer surface of the second connecting member having at least one rib, each of the at least one rib corresponding to one of the at least one groove, respectively; wherein when the second gear rotates with respect to the first gear, the second connecting member rotates with the second sleeve by cooperation of each rib and the corresponding groove, such that the third gear rotates with respect to the fourth gear at the same time.

8. The adjustable lift support apparatus of claim 1, wherein the resilient member is a coil spring.

9. The adjustable lift support apparatus of claim 1, wherein the transmission shaft is pillared.

* * * * *

UNITED STATES PATENT AND TRADEMARK OFFICE
CERTIFICATE OF CORRECTION

PATENT NO. : 7,584,933 B2  Page 1 of 1
APPLICATION NO. : 11/327523
DATED : September 8, 2009
INVENTOR(S) : Ting-Hui Chih It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 378 days.

Signed and Sealed this

Fourteenth Day of September, 2010

David J. Kappos
*Director of the United States Patent and Trademark Office*